Feb. 7, 1961
A. R. McLERRAN
2,970,458
KELLY DRIVE BUSHING
Filed May 1, 1957
3 Sheets-Sheet 1
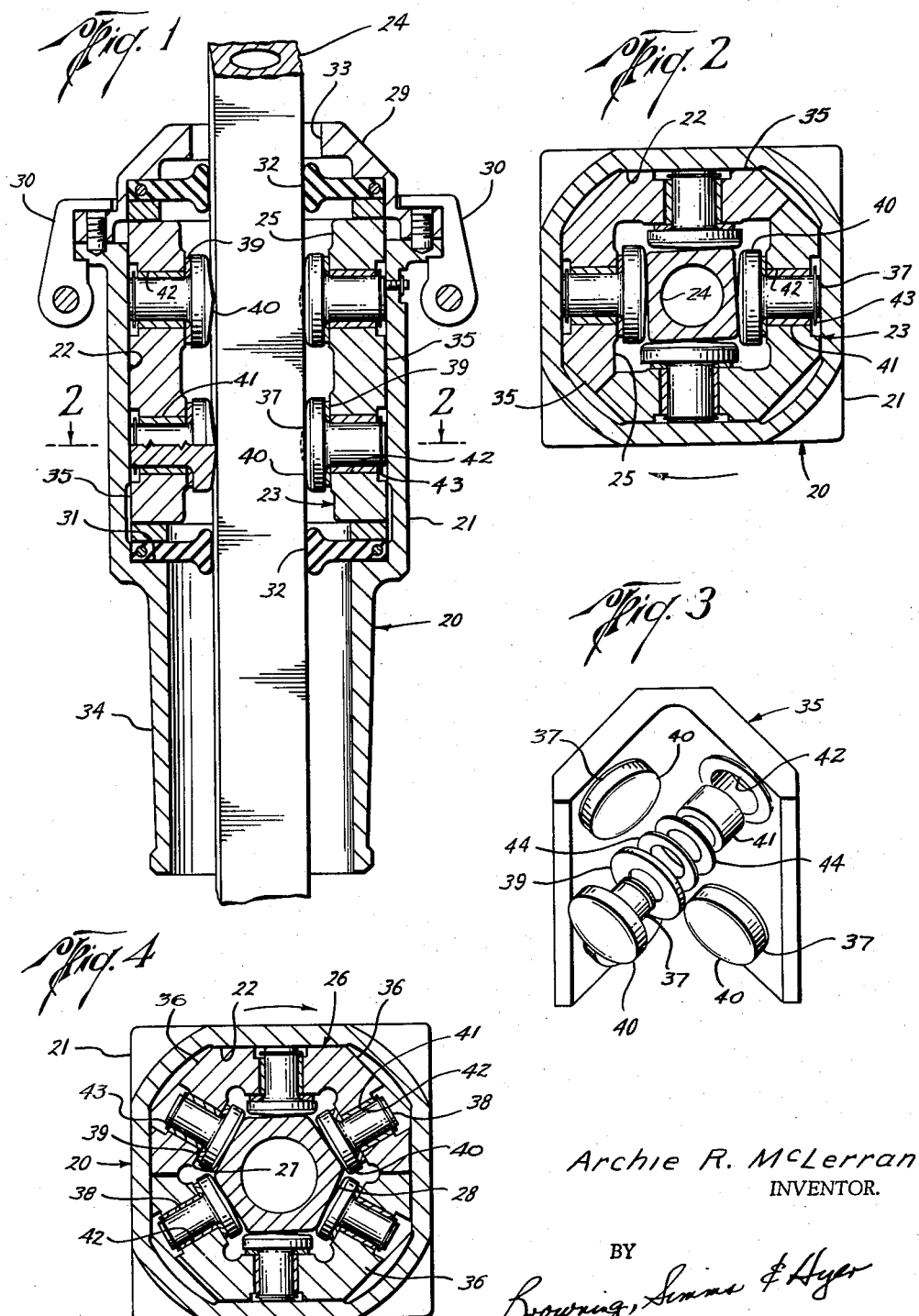
Archie R. McLerran
INVENTOR.
BY
Browning, Simms & Hyer
ATTORNEYS

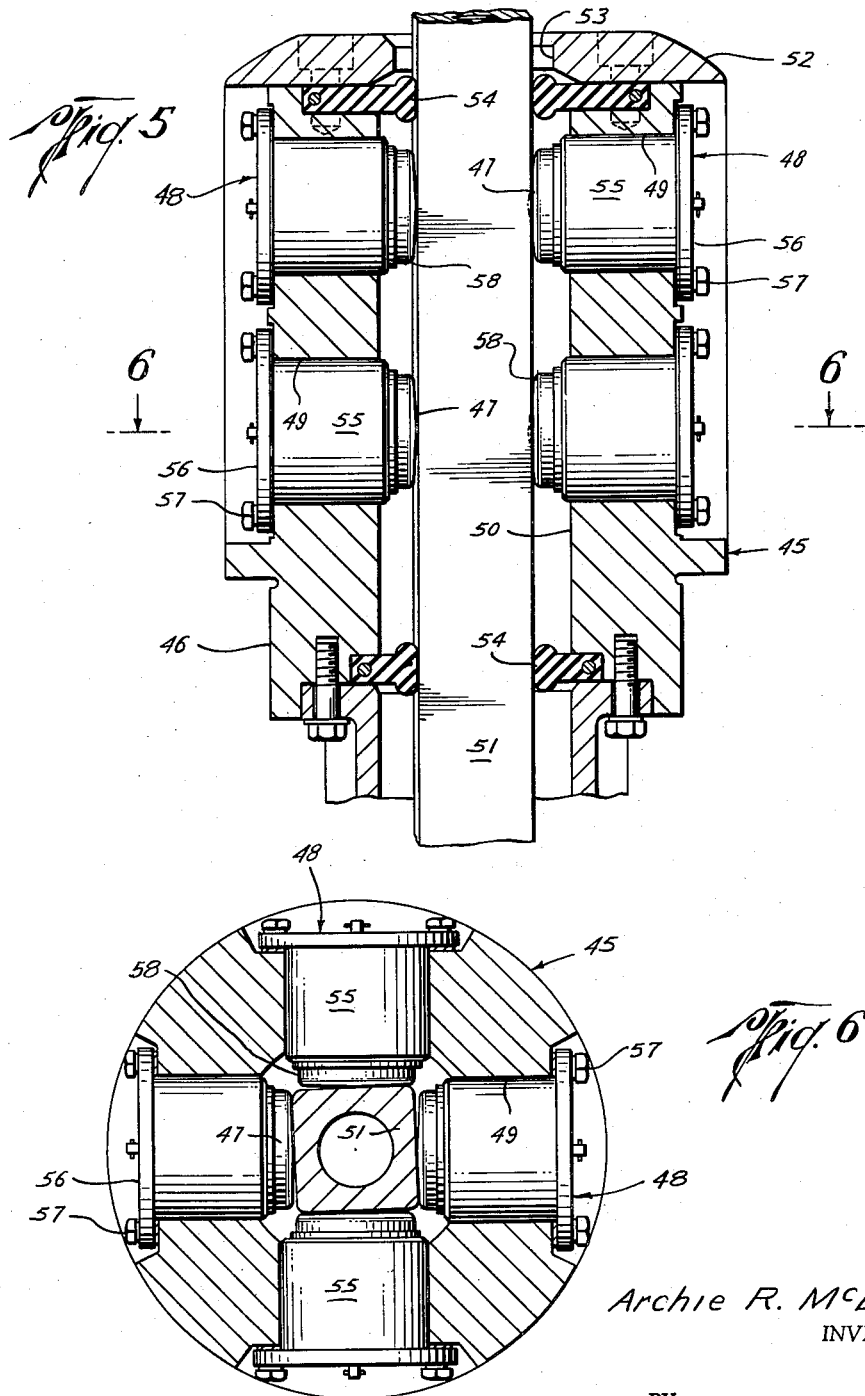

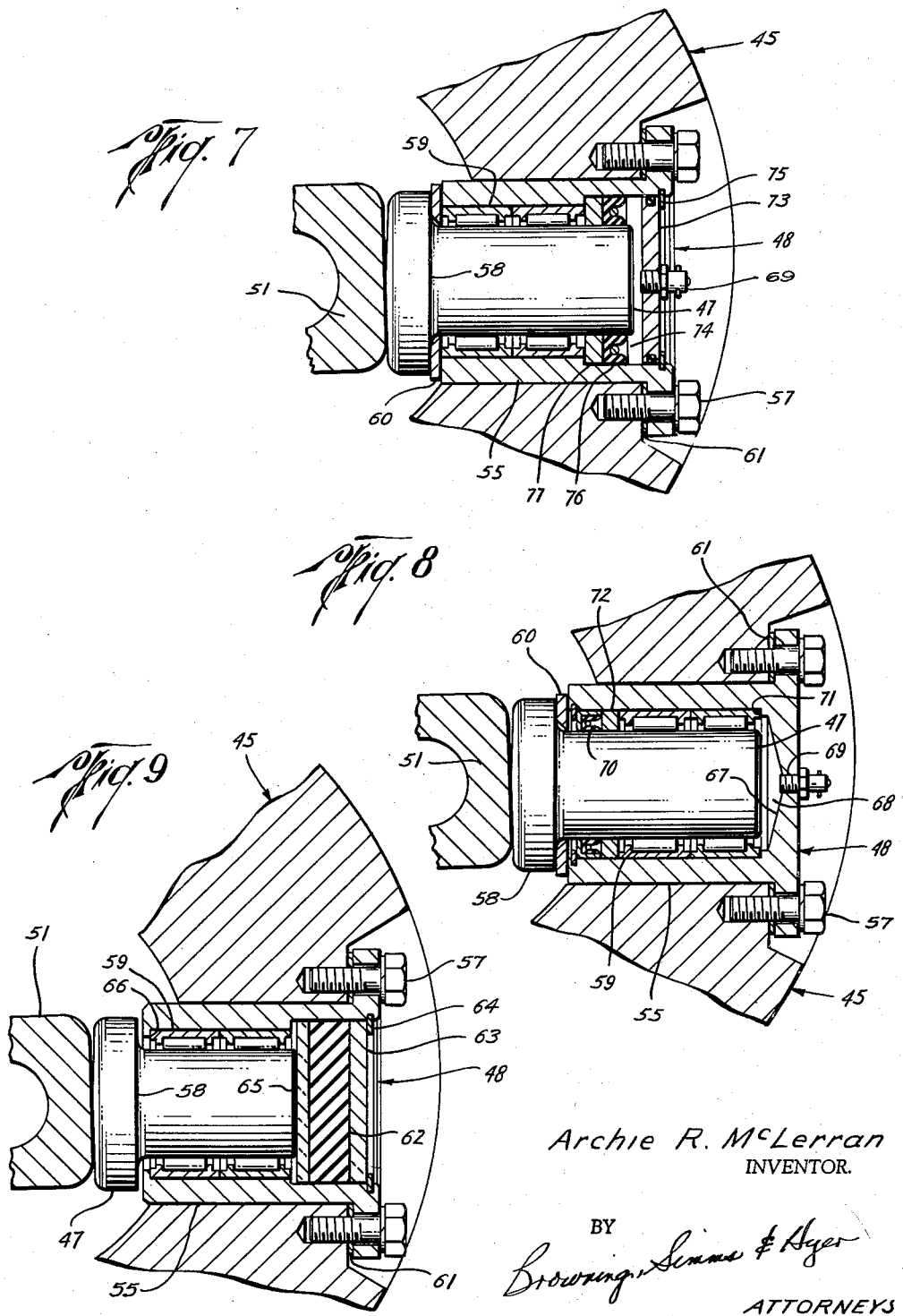

United States Patent Office 2,970,458
Patented Feb. 7, 1961

2,970,458

KELLY DRIVE BUSHING

Archie R. McLerran, Beaumont, Tex., assignor, by mesne assignments, to Dresser Industries, Inc., Dallas County, Tex., a corporation of Delaware Filed May 1, 1957, Ser. No. 656,432

9 Claims. (Cl. 64—23.7)

This invention relates broadly to apparatus for use in the rotary drilling of a well. More particularly, it relates to improvements in a Kelly drive bushing.

In the art of rotary well drilling, rotation is imparted to a bit within a well by means of a kelly connected to the upper end of the drill string. For this purpose, the kelly conventionally comprises a length of pipe having an intermediate outer portion of polyhedral cross-section to which the rotation of a rotary table is imparted by means of a drive bushing disposed therebetween.

It has been conventional to provide such bushings with roller bearings so arranged as to exert a couple upon as well as to facilitate vertical movement of the kelly. In some instances, these rollers have been mounted about axes disposed parallel to the sides of the kelly with which they were engageable, so that they were caused to rotate about such axes due to frictional engagement with the vertically moving kelly. It was found, however, that the couple applied to the kelly caused the ends of the rollers to wear unevenly and dig into the sides of the kelly.

As shown in Bloss et al. Patent No. 2,707,093, it has also been proposed to provide a bushing in which such rollers are mounted about axes disposed substantially perpendicularly to the sides of the kelly engaged thereby and arranged that the frictional engagement of the kelly with the working surfaces on the inner ends of the rollers caused them to rotate about their axes.

It is an object of this invention to provide a bushing having rollers mounted generally in the manner shown in said patent, but so constructed and arranged as to reduce to a minimum the amount of wear both on the working surfaces of the rollers and the sides of the kelly.

Another object is to provide a bushing having improved wear parts for such rollers, which parts are easily and readily replaceable separately of one another.

A further object is to provide a Kelly drive bushing having interchangeably usable roller bearing cages for driving kellys of different polyhedral cross-section.

Still another object is to provide a Kelly drive bushing having novel means to adjust for wear upon the working surfaces of rollers mounted in the general manner shown in the aforementioned patent.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a vertical sectional view of one embodiment of a bushing constructed in accordance with the present invention and including a roller cage for driving a square kelly;

Fig. 2 is a horizontal cross-sectional view of the bushing of Fig. 1, taken substantially along broken line 2—2 of Fig. 1;

Fig. 3 is a perspective view of a part of the roller cage of Figs. 1 and 2, with one of the rollers thereof and its associated wear parts shown in exploded fashion;

Fig. 4 is a horizontal cross-sectional view of the bushing of Figs. 1 to 3, but with the roller cage shown in such figures replaced by a roller cage for driving a hexagonal kelly;

Fig. 5 is a vertical sectional view of another embodiment of a bushing constructed in accordance with the present invention;

Fig. 6 is a cross-sectional view of the bushing of Fig. 5, taken substantially along broken line 6—6 of Fig. 5; and Figs. 7 to 9 are enlarged detailed cross-sectional views of different forms of roller cages usable in connection with the bushings of Figs. 5 and 6.

In its Fig. 1 to 4 embodiment, the bushing of the present invention comprises a housing which is adapted to be rotated with a rotary table (not shown) of a rotary drilling rig in a manner well known in the art and shown, for example, in the aforementioned Bloss et al. patent. For this purpose, the housing includes a hollow body 20 having an outer portion 21 of polyhedral cross-section for fitting closely within a similar shaped opening in the rotary table, and an inner portion 22 of polyhedral cross-section for receiving a roller bearing cage having a bore therethrough to receive a kelly. As shown in Figs. 1 to 3, rollers may be mounted within a cage 23 for driving a square kelly 24 received within a bore 25 through the cage. On the other hand, the cage 23 may be replaced by a cage 26 having rollers mounted therein for driving a hexagonal kelly 28 received within a bore 27 through the cage. As can be seen from a comparison of Figs. 2 and 4, each of the cages 23 and 26 is provided with an outer polyhedral portion fittable closely within the polyhedral portion 22 of the body 20 to provide a drive connection therebetween.

As shown in Fig. 1, a cap 29 having an opening 33 therethrough for receiving the kelly is secured over the upper end of the housing 20 by means of a suitable two-piece clamp ring 30, as shown, for example, in the Bloss et al. patent. This cap locates the roller bearing cage above an internal shoulder 31 on the body and holds parts 32 in sealing engagement about the kelly above and below the cage. If desired, a lubricant may be contained between these parts for lubricating the rollers and kelly. The lower end of the body may be provided with a pilot tube 34 for guiding the bushing into the rotary table.

As well known in this art, and as shown in the Bloss et al. patent, the upper end of the kelly is conventionally provided with an enlarged head for securement to a swivel, and the lower end thereof is conventionally provided with an enlarged tool joint for connection with the drill string. Obviously, therefore, it is necessary that the bushing be so constructed as to permit the rollers to be fitted about the intermediate polyhedral portion of the kelly. In the embodiment of Figs. 1 to 4, this is accomplished by cages made up of a pair of longitudinally split parts 35, in the case of cage 23, and longitudinally split parts 36, in the case of cage 26, which are adapted to be assembled together about the kelly and lowered into the polyhedral portion 22 of the body. Thus, as best shown in Fig. 3, the cage parts are provided with flat outer sides, and the outer corners thereof are removed so as to permit them to be fitted easily within the body of the housing.

As shown in Figs. 1 to 4, rollers are mounted within each cage in vertically spaced apart sets, the number of rollers in each set corresponding to the number of sides of the kelly which is driven by the cage, such that one roller in each set is engageable with each side of the kelly. In the case of the square kelly, each set of four rollers 37 is mounted within the cage 23 in a manner to form a substantially square passage therethrough, as shown in Fig. 2, while, in the case of the hexagonal kelly, each set of six rollers 38 is mounted within the cage 26 in a manner to form a substantially hexagonal passage therethrough, as shown in Fig. 4. It will be understood, of course, that each set of rollers may include two or more rollers engageable with each side of the kelly. Also, the kelly drive bushing may include only one set of rollers; or, on the other hand, it may include more than the two sets illustrated herein.

In both cases, however, the rollers are mounted within openings 42 in the cage intersecting the bore therethrough for rotation about axes disposed perpendicularly to the axis of the kelly received through the bore. The inner ends of the rollers include enlarged discs 40 having working surfaces engageable with the sides of the kelly so received and arranged to rotate the kelly with the cage and rotate the rollers about their axes upon movement of said kelly vertically within said bore. Thus, with reference to each of Figs. 2 and 4, it will be seen that as the body 20, and thus the cage contained therein, is rotated in a clockwise direction, the working surfaces of the rollers mounted in the cage will be caused to bear against the kelly received within the bore of the cage in a manner to exert a clockwise couple thereon. At the same time, inasmuch as the engagement of the working surface of each roller with the kelly is to one side of its rotational axis, each roller will be caused to rotate about its axis as the kelly is moved vertically.

More particularly, and in accordance with one of the novel aspects of the present invention, the working surface on each of the rollers 37 and 38 is conical. As a result, each working surface is worn evenly and adjustment for such wear may be made in the simple manner described hereinafter. Furthermore, the conical working surface of each roller is of such width that its outer edge extends beyond an outer edge of the kelly side it engages so that when the outwardly extending edge is the leading edge of the working surface of the rollers, as illustrated herein, there will be no digging of the roller into the kelly.

It is preferred, in accordance with the present invention, that the width of each roller be substantially equal to that of the kelly side with which it is engageable, and that its axis of rotation be offset an amount just sufficient to extend the outer edge of its working surface beyond said kelly edge. In this manner, the bushing will exert a couple on the kelly which approaches the maximum possible while, at the same time, disposing the outer edge of the working surface of each roller beyond the outer edge of the kelly, for the reasons previously mentioned.

It will be understood that only a relatively small increase in couple could be obtained by making the working surfaces of the rollers of a width greater than the sides of the kelly which they engage. Furthermore, enlargement of the width of the working surfaces of the rollers would render replacement of the rollers or construction of the cage at least more complicated. As shown in the preferred arrangement, the rollers are easily and readily removable from the cage. With an edge of each working surface leading the edge of the kelly side it engages, the leading roller of each cage part is removed first, and the one or two remaining rollers thereof then removed in the order in which they are arranged in a counterclockwise direction from the leading roller.

As best shown in the exploded portion of Fig. 3, a thrust bearing 39 surrounds each roller intermediate the enlarged disc 40 thereof and a surface on the bore 25 of the cage. Each roller is also surrounded by a bushing 41 disposed within the opening 42 in the cage which receives the roller surrounded thereby. These thrust bearings and bushings are separable from one another so that each may be replaced individually, if desired. Obviously, the bushings 41 may comprise roller type antifriction bearings, as will be understood from the description to follow of Figs. 5 to 9.

A snap ring 43 is provided about the outer end of each roller for bearing against the outer side of the cage so as to maintain the rollers in position within the bushings 41 during assembly and movement of the cage. Obviously, upon release of the snap rings, the rollers may be removed from the interior or bore of each cage.

As previously described, the wear upon the conical working surfaces of the rollers will be at least substantially uniform, so that adjustment may be made for such wear without replacing the entire roller. In the embodiment of Figs. 1 to 4, it is contemplated that this adjustment, as well as adjustment for wear on the kelly itself and the cage and body, may be made by means of shims 44 disposed behind the thrust bearing 39 for each roller. As will be more fully understood from the description to follow of the embodiment of Figs. 5 to 9, other means of adjustment for wear may be made, if desired.

The bushing of the above mentioned embodiment of Figs. 5 to 9 comprises a housing which, similarly to the housing of the embodiment of Figs. 1 to 4, is adapted to be received within a rotary table for rotation therewith. This housing includes a hollow body 45 having an outer portion 46 (see Fig. 5) of polyhedral cross-section closely fittable within a similarly constructed opening in a rotary table. However, as distinguished from the previously described embodiment, a kelly 51 is received within a bore 50 through the body 45 and rollers 47 are each mounted within an individual cage 48 received within an opening 49 in the body 45 intersecting the bore therethrough. More particularly, the rollers 47 are disposable about the kelly 51 by insertion of each of the cages 48 into its opening 49 in the body. As shown in Fig. 5, a cap 52 having an opening 53 therethrough for receiving the kelly may be connected to the upper end of the body 45, and parts 54 may be held in sealing engagement with the kelly above and below the cages 48 for containing a lubricant therebetween.

Each of the different forms of cages 48 shown in detail in Figs. 7 to 9 will be seen to include a sleeve 55 releasably connected to the body for extension longitudinally within an opening 49 in said body. In the illustrated embodiment of the invention, this connection includes a flanged outer end 56 on the sleeve bolted to a recessed portion of the body by means of bolts 57. Each of the rollers 47 is mounted within the sleeve 55 for rotation, similarly to the rollers 37 and 38 of the Fig. 1 to 4 embodiment, about an axis disposed perpendicularly to the axis of the bore 50 through the body. As was also the case in the previously described embodiment, the inner end of each roller 47 includes an enlarged disc 58 having a conical working surface engageable with a side of the kelly 51 received within the bore 50 and arranged to rotate the kelly within the housing and rotate the rollers about their axes upon movement of said kelly vertically within said bore. Although, as best shown in Fig. 6, the kelly 51 is square in cross section and the rollers are arranged accordingly in sets of four, it is contemplated that the kelly may be hexagonal or of other polyhedral cross-section and that the rollers and cages may be arranged correspondingly.

As was still further the case in the earlier described embodiment, in their preferred arrangement, each roller 47 is provided with a working surface of a width substantially that of the kelly side it engages, and the axis of rotation of each roller is disposed just forwardly of the kelly axis such that the leading outer edge of said working surface extends a slight amount beyond the leading edge of the kelly side it engages.

It is obvious that each of the rollers 47 is selectively insertable within and removable from its mounted position within the housing body along with the sleeve 55 of its cage. Thus, it will be seen that the opening 49 receiving each of said sleeves is of greater diameter than the roller disc 58.

As shown in Figs. 7 to 9, each cage 48 also includes a bushing 59 in the form of a roller bearing within each sleeve 55 in surrounding relation to the roller 47 mounted therein. The forms of cage shown in Figs. 7 and 8 may still further be provided with a thrust bearing 60 disposed about the roller between its disc 58 and the inner ends of the sleeve 55. If desired, the location of the discs of each roller may be adjusted for wear by means of shims 61 located between the flange 56 of each sleeve and a recessed portion on the bushing body 45. A similar means of adjustment may also be provided in the form of cage shown in Fig. 9.

In this last mentioned form of cage, it is contemplated that the rollers 47 thereof will be cushioned by a disc 62 of suitable resilient material held within the sleeve 55 rearwardly of the outer end of the roller. As can be seen from Fig. 9, this disc 62 is located between plate 63 held in place by a snap ring 64 and another plate 65 adjacent the outer end of the roller such that the resilient material thereof is prevented from extruding. The bushing or roller bearing 59 is located longitudinally of the sleeve by means of an internal shoulder 66 on the sleeve and the plate 65. Due to this arrangement for absorbing shock, it is not contemplated that a thrust ring will be disposed behind the disc of the roller.

In the forms of cages shown in each of Figs. 7 and 8, the location of the working surface for each roller may be adjusted by means of a fluid piston chamber within each cage. For this purpose, the outer end of the sleeve 55 of the Fig. 8 form is provided with a cover 67 thereacross to enclose a chamber 68 rearwardly of the roller therein. Means in the form of a valved port 69 is provided through each cover 67 for filling the space 68 with grease or the like under pressure. Obviously, this arrangement permits the location of the working surface of each roller to be adjusted by the addition to the space 68 of grease or the like.

The chamber 68 is sealed by means of a seal ring 70 disposed annularly between the roller 47 and the sleeve 55. In this particular form, the seal ring 70 is disposed inwardly of the bushing 59 so that the grease contained within the space 68 will lubricate same. This bushing or roller bearing is located longitudinally of the sleeve by means of an internal shoulder 71 thereon and a ring 72 rearwardly of the seal ring 70.

The form of cage shown in Fig. 7 will be found to be similar to that of Fig. 8 except that its cover 73 for enclosing space 74 rearwardly of the roller mounted within the cage is removably located across the outer end of the sleeve by means of a snap ring 75. It will also be noted that a seal ring 76 surrounding the roller within the sleeve is disposed outwardly of the bushing or roller bearing 59, and that the latter is located within the sleeve between the thrust ring 60 and a ring 77 forwardly of the seal ring 76.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A Kelly drive bushing, comprising a housing adapted to be received within a rotary table for rotation therewith, said housing including a body having a bore therethrough for receiving a kelly and a plurality of openings therein intersecting the bore, a plurality of cages each including a sleeve movable longitudinally into one of said openings from the exterior of the body, means releasably connecting the sleeves to the body when the same are disposed in said openings, and a roller mounted in the sleeve of each cage for rotation about an axis disposed perpendicularly of the axis of the bore through the body, the inner end of each roller being smaller than said openings but enlarged to provide a working surface engageable with a side of a kelly received within the bore to rotate the kelly within the housing and rotate the rollers about their axes upon movement of said kelly vertically within said bore, and each roller being removable with the cage in which it is mounted upon disconnection of the sleeve of said cage from the body.

2. A Kelly drive bushing of the character defined in claim 1, including a bushing within each sleeve in surrounding relation to the roller mounted therein.

3. A Kelly drive bushing of the character defined in claim 1, including a cover across the outer end of each sleeve enclosing a space therein rearwardly of the roller mounted therein, and means for filling said space with a pressure fluid.

4. A Kelly drive bushing of the character defined in claim 1, including a bushing within each sleeve in surrounding relation to the roller mounted therein, a cover across the outer end of the sleeve for enclosing a space rearwardly of the roller, an opening through said cover to permit said space to be filled with a pressure fluid, and seal means disposed annularly between each of said rollers and sleeve.

5. A Kelly drive bushing of the character defined in claim 1, including a disc of resilient material disposed across each sleeve for abutment with the rearward end of the roller mounted therein.

6. A Kelly drive bushing comprising a housing adapted to be received within a rotary table for rotation therewith and having a bore therethrough for receiving a kelly; a plurality of rollers mounted within the housing for rotation about axes disposed perpendicular to a vertical plane through the axis of said bore but offset in the direction of rotation of said table from the axis of the bore; and a conical working surface on the inner end of each roller engageable with a side of a kelly received in said bore and arranged to rotate the kelly with the housing and rotate the rollers about their axes upon movement of said kelly vertically within the bore, each conical working surface being of such width that its outer edge extends beyond a leading edge of a side of the kelly which it engages.

7. A Kelly drive bushing of the character defined in claim 6 wherein the width of each conical working face is substantially equal to the width of the kelly side with which it is engageable, and its axis of rotation is offset an amount just sufficient to extend the outer edge of its working surface beyond said leading kelly edge.

8. A Kelly drive bushing comprising a housing adapted to be received within a rotary table for rotation therewith and having a bore therethrough for receiving a kelly; a plurality of rollers mounted within the housing for rotation about axes disposed perpendicular to a vertical plane through the axis of the bore therethrough but offset from the axis of said bore in the direction of rotation of said rotary table, each roller including an enlarged disc at the inner end thereof having a conical working surface engageable with a side of a kelly received within said bore and arranged to rotate the kelly with the housing and rotate the rollers about their axes upon movement of said kelly vertically within the bore; a thrust bearing surrounding each roller intermediate its disc and said housing; and a bushing separate from the thrust bearing surrounding each roller within the housing.

9. A Kelly drive bushing comprising a housing adapted to be received within a rotary table for rotation therewith and having a bore therethrough for receiving a kelly; a plurality of rollers mounted within the housing for rotation about axes disposed perpendicular to a vertical plane through the axis of a bore therethrough but offset from the axis of the bore in the direction of rotation of said rotary table, each roller including an enlarged disc at the inner end thereof having a working surface engageable with a side of a kelly received within said bore and arranged to rotate the kelly with the housing and rotate the rollers about their axes upon movement of said kelly vertically within the bore; a thrust bearing surrounding each roller intermediate its disc and said housing; a plurality of shim washers also surrounding each roller intermediate its disc and said housing, said shim washers being removable to readily adjust the clearance between the working surface of each roller and each kelly side; and a bushing separate from the thrust bearing surrounding each roller within the housing.

References Cited in the file of this patent

UNITED STATES PATENTS

| | | |
|---|---|---|
| 672,613 | Cater | Apr. 23, 1901 |
| 2,023,796 | Sorensen et al. | Dec. 10, 1935 |
| 2,140,659 | Vock | Dec. 20, 1938 |
| 2,171,176 | Greve | Aug. 29, 1939 |
| 2,179,645 | Spalding | Nov. 14, 1939 |
| 2,337,795 | Austin | Dec. 28, 1943 |
| 2,597,516 | Noe | May 20, 1952 |
| 2,707,093 | Bloss et al. | Apr. 26, 1955 |